United States Patent
Banham et al.

(10) Patent No.: US 8,061,032 B2
(45) Date of Patent: Nov. 22, 2011

(54) FABRICATION OF COOLING AND HEAT TRANSFER SYSTEMS BY ELECTROFORMING

(75) Inventors: Robert David Banham, Woodbridge (GB); Arnoldo Valenzuela, Munich (DE)

(73) Assignee: Media Lario S.R.L., Bosisio Parini (IT)

( * ) Notice: Subject to any disclaimer, the term of this patent is extended or adjusted under 35 U.S.C. 154(b) by 1318 days.

(21) Appl. No.: 10/580,397

(22) PCT Filed: Nov. 23, 2004

(86) PCT No.: PCT/EP2004/013296
§ 371 (c)(1),
(2), (4) Date: Feb. 13, 2007

(87) PCT Pub. No.: WO2005/054547
PCT Pub. Date: Jun. 16, 2005

(65) Prior Publication Data
US 2007/0134908 A1    Jun. 14, 2007

(30) Foreign Application Priority Data
Nov. 25, 2003  (WO) .................. PCT/IT03/00771

(51) Int. Cl.
*B21D 51/16* (2006.01)
*B23P 17/00* (2006.01)

(52) U.S. Cl. ..... 29/890.09; 29/527.1; 29/825; 29/592.1; 205/67; 427/457; 427/58; 427/99.5; 204/450; 204/471; 204/485

(58) Field of Classification Search ............ 29/527.1, 29/527.2, 890.09, 890.1, 825, 829, 830, 592.1; 205/67–79; 427/457, 58, 99.5, 105; 204/450, 204/471, 485
See application file for complete search history.

(56) References Cited

U.S. PATENT DOCUMENTS

| | | | | |
|---|---|---|---|---|
| 4,205,428 A * | 6/1980 | Ernstoff et al. | ............ | 29/592.1 |
| 4,736,521 A * | 4/1988 | Dohya | ............ | 29/830 |
| 4,790,902 A * | 12/1988 | Wada et al. | ............ | 216/20 |
| 2003/0026697 A1* | 2/2003 | Subramanian et al. | ..... | 416/97 R |
| 2008/0246558 A1 | 10/2008 | Brown et al. | | |

FOREIGN PATENT DOCUMENTS

| | | |
|---|---|---|
| DE | 19920161 | 5/2000 |
| EP | 0113883 | 7/1984 |
| JP | S61-210636 | 9/1986 |
| JP | H06-34283 | 2/1994 |

OTHER PUBLICATIONS

PCT Written Opinion PCT/EP2004/013296.
PCT International Search Report PCT/EP2004/013296.
PCT Written Opinion PCT/EP2004/013296.

* cited by examiner

*Primary Examiner* — Derris Banks
*Assistant Examiner* — Jeffrey T Carley
(74) *Attorney, Agent, or Firm* — Opticus IP Law PLLC

(57) ABSTRACT

A process for fabricating a metallic component is disclosed. The process includes performing multiple electroforming steps on an object to form metallic layers. The process includes performing between the electroforming steps masking and patterning steps using a non-conductive material. The resulting metallic component has either a single layer or multiple layers of cooling or heat transfer channels, which may be at right angles in adjacent layers. The non-conductive material can be removed during the process by a solvent or by melting. The object on which the metallic component is formed may be a flat or shaped mandrel from which the metallic component can be removed. The metallic component is particularly useful in forming optical components for use in extreme ultraviolet (EUV) systems and in cooling and heat transfer systems.

16 Claims, 4 Drawing Sheets

FABRICATION OF COOLING AND HEAT TRANSFER SYSTEMS BY ELECTROFORMING

CROSS REFERENCE TO RELATED APPLICATIONS

This application is a U.S. national stage entry of international application PCT/EP2004/13296, filed Nov. 23, 2004, which claims the benefit of the filing date of international application PCT/IT03/00771, filed Nov. 25, 2003.

FIELD OF THE INVENTION

The present invention relates to componentry for diverse forms of industry, and more particularly to the fabrication of cooling and heat transfer systems by electroforming.

There are numerous technologies involving the use of (typically metal) components that, in use, are subjected to high temperatures or find their temperatures raised, e.g. through contact with fluids that are at high temperature and/or pressure. Such components include those that are used in energy generation and heat transfer systems, and in propulsion systems. Particular examples would be reactor vessels, combustion chambers and rocket engines. There is typically a need to provide cooling of such components or to provide components in which heat is transferred from one fluid to another.

A problem with known systems is that the efficiency of such systems is not as high as it could be as the cooling or rate of heat transfer is less than desired.

A further drawback is that the conventional methods for fabrication of the components and systems are not suited to fabrication of diverse forms of componentry, with integrated cooling/heat transfer elements, and in the necessary materials, or they result in a significantly increased cost of the component for a compromise design.

There is a need for fabrication techniques that overcome the aforementioned problems and provide improved fabrication processes and components. There is furthermore a need for techniques for the fabrication of such components at reduced cost.

The present invention provides a process for the fabrication of a metallic component, comprising: providing an object having surface; performing a first electroforming operation, thereby forming a first metallic layer comprising a metallic material on said surface; forming a first mask layer on the first metallic layer, the first mask layer comprising a non-conductive material; patterning the first mask layer, thereby providing a plurality of first recesses in the first mask layer from which the non-conductive material above the first metallic layer is removed, said first recesses having a dimension of elongation; performing second electroforming operation using said metallic material whereby said first recesses are filled with said metallic material and a second metallic layer is formed comprising said metallic material extending at least a first predetermined thickness above, and entirely or partially over the surface of, said first mask layer.

Suitably, the object comprises a substrate and said surface comprises a flat or substantially flat surface of the substrate. Alternatively, the object comprises a shaped mandrel (which may be any shape, within reason, for example by machining), the mandrel defining (for example in negative) said surface, the surface being for example cylindrical, conical, parabolic, hyperbolic, elliptical or spherical.

The process preferably further includes the step of: machining said second metallic layer to form a uniformly thick second metallic layer, said second metallic layer thereby having a upper surface. The process preferably further includes the step of: removing the object and removing the non-conductive material of the first mask layer, thereby producing a metallic component having first elongate channels extending therein where the non-conductive material has been removed.

In another aspect of the invention, the process further includes: forming a second mask layer on the upper surface of the second metallic layer, the second mask layer comprising a non-conductive material; patterning the second mask layer, thereby providing a plurality of second recesses in the second mask layer from which the non-conductive material above the second metallic layer is removed, said second recesses having a dimension of elongation; performing a third electroforming operation using said metallic material whereby said second recesses are filled with said metallic material and a third metallic layer is formed comprising said metallic material extending at least a second predetermined thickness above, and entirely or partially over the surface of, said mask layer.

The process preferably further includes the step of: machining said third metallic layer to form a uniformly thick third metallic layer, said third metallic layer thereby having a upper surface. The process preferably further includes the step removing the object and removing the non-conductive material of the first mask layer and the second mask layer, thereby producing a metallic component having first elongate channels extending therein where the non-conductive material of the first mask layer has been removed and having second elongate channels extending therein-where the non-conductive material of the first mask layer has been removed.

Various patterning configurations are possible. Thus, the step of patterning the first mask layer and/or the step of patterning the second mask layer may be performed such that 'the first recesses are wider than the second recesses, or vice versa; and/or the-first elongate channels are wider than the second first elongate channels, or vice versa; the first elongate channels and/or the second first elongate channels taper in width or in thickness along their respective directions of elongation; and/or 'the direction of elongation of the first elongate channels is at an angle to that of the second first elongate channels, for example at right angles; and/or the first elongate channels and/or the second first elongate channels are provided with projections, sidewall recesses and/or baffling, whereby non-linear flows though such channels may be achieved.

In one embodiment: the steps of performing a first electroforming operation, forming a first mask layer, patterning the first mask layer, and performing second electroforming are performed such that the first metallic layer, the first mask layer and the second metallic layer extend over a predetermined first two-dimensional area; and the steps of forming a second mask layer, patterning the second mask layer and performing a third electroforming operation are performed such that the second metallic layer, the second mask layer and the third metallic layer extend over a predetermined second two-dimensional area; wherein the second two-dimensional area is larger than the first two-dimensional area.

Suitably, the first electroforming operation is performed such that the thickness of the first metallic layer is about 100 to although greater or lesser thicknesses are possible. Preferably, said second electroforming operation is performed such that said predetermined thickness is at least as thick as the thickness of the first metallic layer, and said machining step comprises machining the second metallic layer to a thickness equal to or about equal to the thickness of the first metallic layer.

Alternatively, said first electroforming operation is performed for an extended period, whereby the thickness of the first metallic layer is at least as large as the thickness of the first mask layer, and is for example 1-2 mm or more, although greater or thicknesses are possible. Alternatively or additionally, said second electroforming operation is performed for an extended period, whereby the thickness of the second metallic layer is at least as large as the thickness of the first mask layer, and is for example 1-2 mm or more, although greater or lesser thicknesses are possible.

Preferably, the step of forming a first mask layer comprises coating the first metallic. layer with said non-conductive material to a thickness of 1-2 mm, although greater or lesser thicknesses are possible.

The step of forming a second mask layer may comprise coating the second metallic layer with said non-conductive material to a thickness of 1-2 mm, or to a thickness greater than the thickness of the first mask layer, although greater or lesser thicknesses are possible.

Preferably, the step of removing the object removing the non-conductive material comprises dissolving said non-conductive material in a solvent or melting said object and/or non-conductive material.

In one embodiment, the object is an existing metallic component, for example made of steel, copper or bronze; and the system of channels (e.g. for cooling) remains attached to the object, thereby forming a new component.

The metallic material used in the electroforming may nickel, copper, cupronickel, nickel containing ceramic powder, or copper containing ceramic powder, or an alloy containing iron and/or cobalt.

Typically, nickel is used where the strength of the final component is a priority; and copper is used where it is important for the component to have good thermal conductivity.

In embodiments, the metallic material used in the second electroforming operation is different to the metallic material used in the first electroforming operation, and/or the metallic material used in the third electroforming operation is different to the metallic material used in the second electroforming operation.

Preferably, the non-conductive material used in the steps of forming a first mask layer and/or forming a second mask layer comprises a low melting point polymer, for example (PMMA) or microcrystalline wax.

In another aspect of the invention there is provided a metallic component obtainable by the method of any of the appended claims 1 to 16.

An advantage of the invention, or embodiments thereof, is that it is suitable for fabrication of a wide range of components, and has the particular benefit of providing integral systems. For example, it is possible to produce metallic objects having cooling channels integrally formed in the production process by electroforming. It is possible to produce thin-walled components (e.g. X-ray or high energy UV mirrors or telescopes) having internal cooling ducts without compromising the external dimensions or the surface finish, and to produce thick-walled sections (e.g. combustion chambers, reactors, rocket engines) having fine tubes or cooling channels incorporated within them, without significantly compromising structural integrity.

A further advantage is that components and systems with increased transfer efficiency may be fabricated, and on a variety of scales (dimensions) of component.

A further advantage is that components and systems fabricated in accordance with the invention, or embodiments thereof, are capable of producing heat flow pattern (s) of a complexity that cannot be achieved by conventional methods.

The use of extremely small tube transfer channel) dimensions, and wall thicknesses between the tubes, is possible; these may be for example of the order of Further, the use of multiple layers of fine tubes (channels) advantageously gives a much contact area than one large tube: important for rates of transfer. In addition, in accordance with certain embodiments, the tube (channel) geometry may be varied over the length thereof for example by having tapering tubes, tubes with aspect ratios that vary over the length, and tubes with restrictions, baffles, etc.

While the advantages in terms of cooling heat transfer performance have been mentioned, the invention, or embodiments thereof, permit a component to be fabricated with a system of channels such that the hollow portions reduce the overall weight of the component. Thus, the effect is to increase, compared with a solid component, the strength per unit mass of the component. This is beneficial in many applications, for example in a satellite-borne mirror that is subject, in use, to strong gravitational forces.

Embodiments of the invention will now be described, by way of example, with reference to the accompanying drawings, in which:

FIGS. 1 (*a*) to 1 show processing steps in the fabrication, in accordance with embodiments of the invention, of metallic component;

Figure 1A:
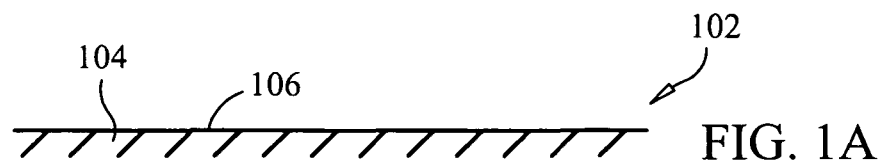
Figure 1B:
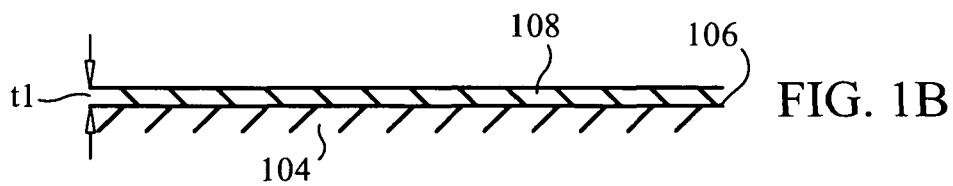
Figure 1C:
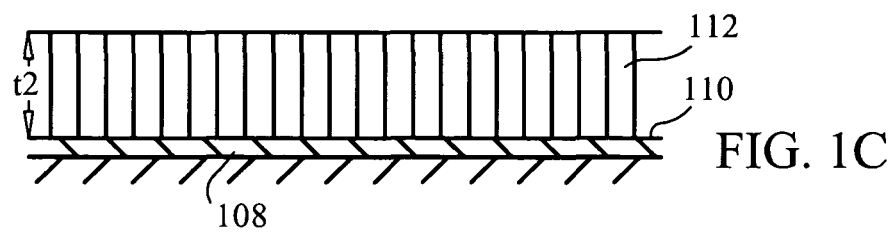
Figure 1D:
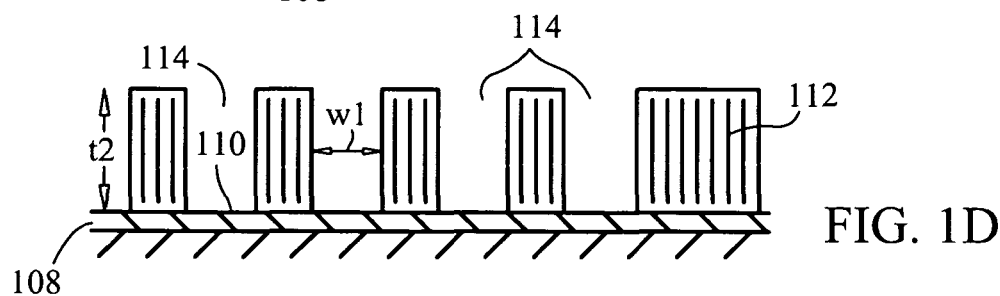
Figure 1E:
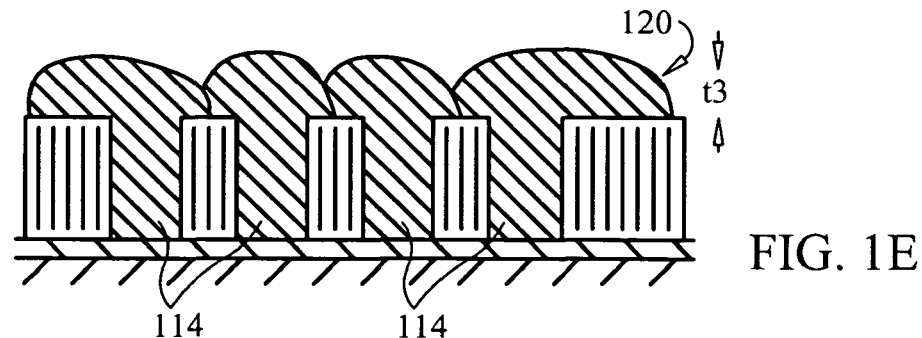
Figure 1F:
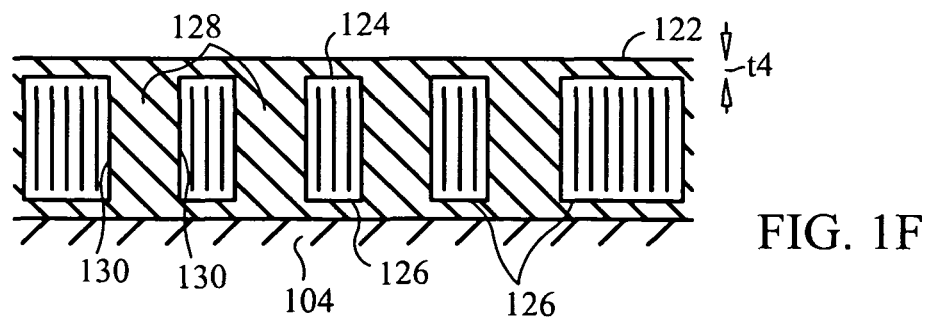

In the following, various embodiments will be described, applicable to the fabrication of components and systems for use in diverse industrial and engineering environments. Such applications include the following.

(i) Precision optics where high energy levels are involved (e.g., EUV lithography, synchrotrons, solar concentrators).

(ii) High temperature containment vessels g. combustion chambers, rocket nozzles).

(iii) High energy conductors in high temperature environments (e. spherical Tokomak central core).

(iv) Micro heat exchangers.

(v) Heat shield and temperature uniformity applications.

However, the invention is applicable to any application where it is desirable to fabricate a component (or provide an existing component with) a set of channels or ducts, or multiple (e.g. communicating) sets of channels or ducts in respective layers, for the passage of cooling or heat transfer fluid (also referred to herein as cooling or heat transfer systems).

Turning to FIG. 1, this show processing steps in the fabrication, in accordance with embodiments of the invention, of metallic component. As indicated in FIG. 1 (a), an object generally designated 102. In this case the object comprises a substrate or base layer 104 formed of a metal such as aluminium or steel (or ceramic, where appropriate coated with metal such as gold or ruthenium), having an upper surface However, in certain embodiments the object may be a shaped mandrel, negative mould, or some existing mechanical component onto which further features are to be added. For example, in the fabrication of an optical telescope mirror with a concave parabolic reflecting surface, the mandrel may be shaped so as to have a convex parabolic outer surface, suitably polished, upon which one or more metal layers (e.g. including an initial reflective layer) are formed, including one or more-layers with transfer channels as described in more detail hereinafter.

Referring to Fig. (b), an initial electroforming operation is performed so as to deposit a first metal layer on the upper surface 106 of the substrate 104. Electroforming-techniques are well known to persons skilled in the art, and the details thereof will not be repeated, for the sake of brevity. The metal of first metal layer 108 may be nickel, copper or any other metal suitable for electroforming. The duration electroforming operation depends on the thickness t1 of the first metal layer 108 required: this may be of the order of 100-200 or may be some millimeters, but may be more or less than this, depending on the particular application or component to be fabricated.

This step is followed by the formation (FIG. 1 (c)) of a first mask layer 112 on the top surface 110 of the first metal layer 108. The first mask layer 112 is suitably formed by adhesion (gluing) of a polymer sheet, as is known in the art (alternatively, the first mask layer 112 may be formed by casting of a dissolved or melted material). The first mask layer 112 suitably comprises a low melting point material such as PMMA, although other materials may be used. The first mask layer 112 may be formed in a variety of thicknesses (t2), depending on the application: it may be of the order of a millimeter or two, or for example an order of magnitude or more greater than the thickness t1 of the first metal layer 108.

Next, the first mask layer is patterned, using a precision milling or turning machine, resulting in the product shown in FIG. 1 (d). Alternatively, a laser cutting machine or optical lithography process may be used. The patterning step removes, in selected areas, the material of the first mask layer 112 above the surface 110 of the first metal layer 108, generating first elongate recesses 114 (extending into the paper in FIG. 1 (d)). The width w1 of the first elongate recesses 114 is highly variable depending on the application, and may be for example 0.5 to 1.0 times the thickness t2 of the first mask layer 112.

However, the width may be (a) several hundred lim and upwards (e.g. greater than about by machining, (b) several tens of (e.g. greater than about by laser cutting, and (c) a few (e.g. greater than about by lithography. The upper limit on the width may be anything within reason (e. several mm up to several centimeters).

Thereafter, a second electroforming operation is performed. Suitably this is done using the same metal (nickel) as in the first electroforming, but the materials may be different. As illustrated in FIG. 1 (e) the second electroforming is performed to an extent such that the first elongate recesses 114 are entirely filled with metal 116; and the metal overflows typically creating bulges 118 that coalesce to form a rough upper metal layer 120 having a thickness at its narrowest point that is indicated as t3.

Next, as illustrated in Fig. (f), the rough upper metal layer 120 is machined by suitable electronically controlled machine tool, to produce a flat or substantially flat upper surface 122. Thus a second metal layer 124 is produced, having a thickness t4, where although it is also possible, depending on the application, that or At this stage, there is a metallic structure having parallel outer layers and surfaces, adhered to a substrate 104, and having a series of first elongate channels 126 filled with polymer (PMMA) separated by first sidewalls 128. In this case the surfaces.

130 of the sidewalls 128 are flat. The further processing of this intermediate product may take several forms.

Figure 2:
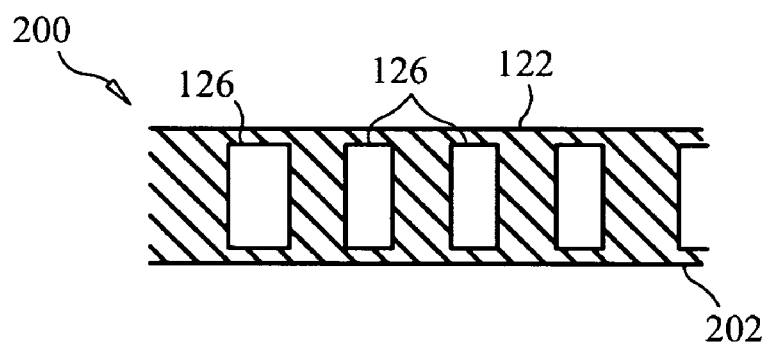
FIG. 2 illustrates the technique of fabricating, in accordance with a first embodiment of the invention, a first type of metallic component.

FIG. 2 illustrates the technique of fabricating, in accordance with a first embodiment of the invention, a first type of metallic component, generally designated 200. Here, after the process of FIGS. 1 (a) to (f), the material of the substrate 104 and the polymer in first elongate channels 126 is removed by melting at a suitably high temperature (e.g. in an oven), or by dissolving in a suitable (e.g. organic) solvent, such as chloroform. The component 200 has parallel surfaces 122, 202, and has a series of empty first elongate channels 126 running therethrough. Where substrate is a metal substrate, typically it is removed by mechanical separation.

Although the component 200 is indicated as having a flat configuration, it will be appreciated by persons skilled in the art that, depending on the shape of the object or mandrel used at the start of the process, the component may be or form part of a structure that is spherical, conical, parabolic, hyperbolic, etc.

Figure 3:
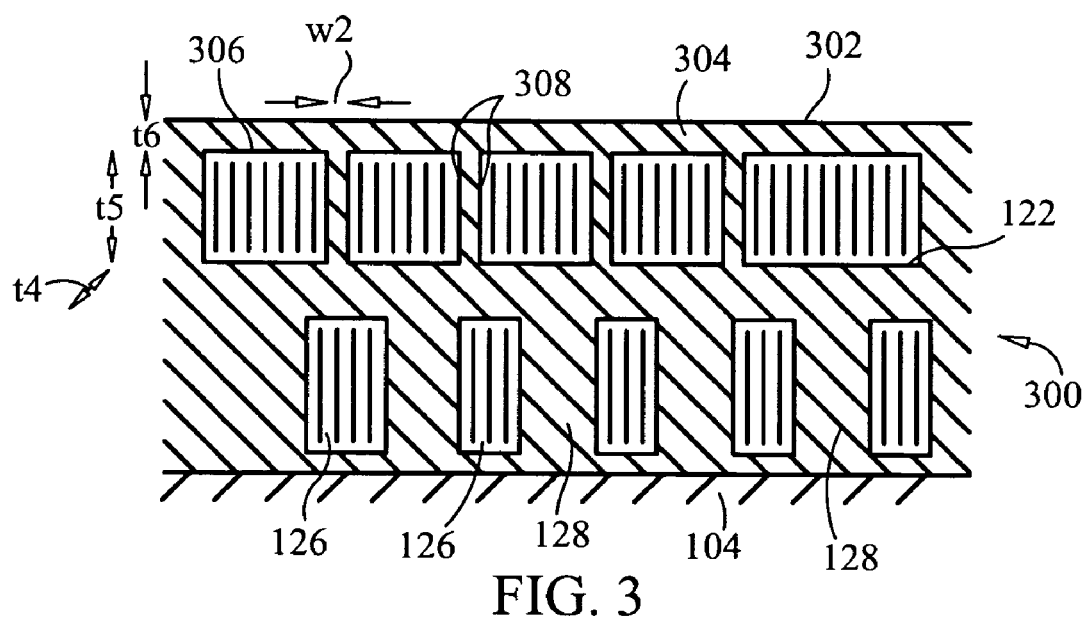
FIG. 3 illustrates the technique of fabricating, in accordance with a second embodiment of the invention, a second type of metallic component

FIG. 3 illustrates the technique of fabricating, in accordance with a second embodiment of the invention, a second type of metallic component, generally designated 300. The process may be the same as with respect to the first embodiment, except as described below. In this case, after the point illustrated in FIG. 1 this step is followed by the formation of second mask layer on the top surface 122 of the second metal layer 124. The second mask layer 112 is suitably formed by adhesion (gluing) of a polymer sheet, as is known in the art (alternatively, the first mask layer 112 may be formed by casting or melting of a dissolved material). The second mask layer 112 suitably comprises a low melting point material such as PMMA, although other materials may be used. The second mask layer 112 may be formed in a variety of thicknesses (t5), depending on the application: it may be of the order of a millimeter or two, or for example an order of magnitude or more greater than the thickness t4 of the first metal layer 108 or second metal layer respectively.

Next, the second mask layer is patterned, using a precision milling or turning machine, resulting in a configuration similar to that shown in Fig. (d). Alternatively, a laser cutting machine or optical lithography process may be used. The patterning step removes, in selected areas, the material of the second mask layer above the surface 122 of the second metal layer 124, generating second elongate recesses (extending into the paper). The width w2 of the second elongate recesses is highly variable depending on the application, and may be for example 0.5 to 1.0 times the thickness t5 of the second mask layer 112. However, the width may be (a) several hundred (e.g. greater than about by machining, (b) several tens (e.g. greater than about by laser cutting, and (c) a few (e.g. greater than about 1 by lithography. The upper limit on the width may be anything within reason (e.g. several mm up to several centimeters).

As before, the rough upper metal layer is machined by suitable electronically controlled machine tool, to produce a flat or substantially flat upper surface 302. Thus a third metal layer 304 is produced, having a thickness t6, where it is also possible, depending on the application, that t6<t4 or t6>t4. At this stage, there is a metallic structure having parallel outer layers and surfaces, adhered to a substrate 104, and having a series of first elongate channels 126 filled with by first sidewalls 128, and a series of second elongate channels 306 filled with polymer (PMMA) separated by second sidewalls 308.

There results (FIG. 3) a structure, from which the object (substrate, mandrel) can be removed as before, that has (here parallel) first elongate channels 126 and second elongate channels 306 that are may be used (by passing fluid therethrough) for heat transfer/cooling of the component 300.

Figure 4:
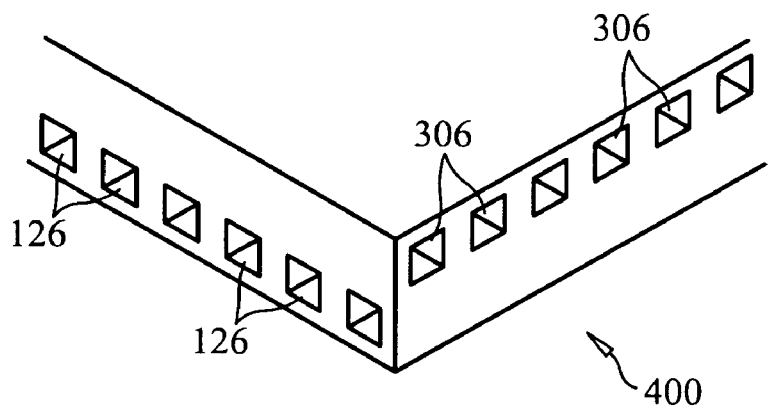
FIG. 4 illustrates the technique of fabricating, in accordance with a third embodiment of the invention, a third type of metallic component.

FIG. 4 illustrates the technique of fabricating, in accordance with a third embodiment of the invention, a third type of metallic component, generally designated 400. Here, the process is the same as the embodiment of FIG. 3, except that the patterning of the second mask layer is performed so that the recesses created, and therefore the resulting second elongate channels 306, extend in a direction that is transverse (at 90 degrees; although any other suitable angle may be employed) to that of the first elongate channels 126. This configuration finds particular application in heat transfer systems, e.g. as a heat exchanger: here, a hot fluid is passed through the first elongate channels 126 and a cold fluid is passed through the second elongate channels 306, in each case for example by suitable pumping or convection. In this case, the component 400 is suitably made of copper.

Figure 5:
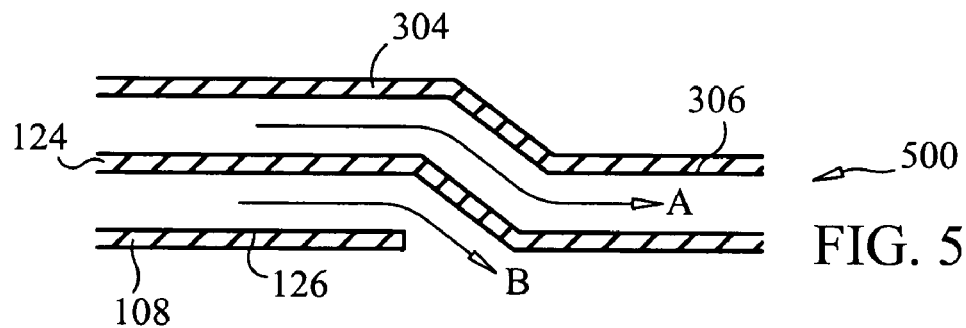
FIG. 5 illustrates the technique of fabricating, in accordance with a fourth embodiment of the invention, a fourth type of metallic component.

FIG. 5 illustrates the technique of fabricating, in accordance with a fourth embodiment of the invention, a fourth type of metallic component, generally designated 500. Here, the component 500 is shown in cross-section. The process is the same as is described with respect to FIG. 3, except that the first metal layer 108 and the first mask layer 112 are fabricated over a first two dimensional area (e.g. square) on the substrate 104. However, the second metal layer 124, the second mask layer (not shown) and the third metal layer 304 are fabricated over a second two-dimensional area that is greater than the first two-dimensional area. In this way, there can be provided fluid flows (indicated by arrows A, B) that overlap, and that may be transverse or extend in three dimensions.

Figure 6:
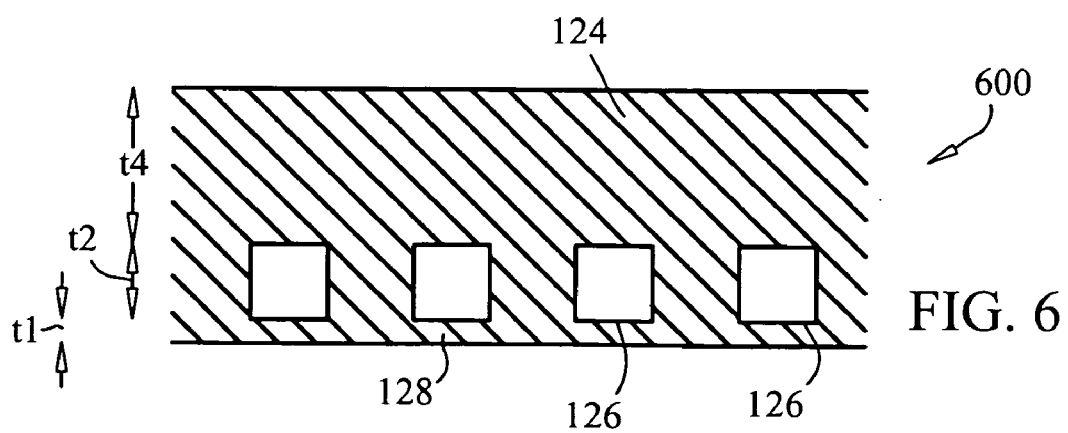
FIG. 6 illustrates the technique of fabricating, in accordance with a fifth embodiment of the invention, a fifth type of metallic component.

FIG. 6 illustrates the technique of fabricating, in accordance with a fifth embodiment of the invention, a fifth type of metallic component, generally designated 600. This is employed in the fabrication of a relatively thick-walled component, where high strength is required. In this case, the process is that same as described with reference to FIG. 2, except that the second electroforming operation is performed for an extended period. The result is that the thickness t4 of the second metallic layer 124 is much greater than the thickness t1 of the first metallic layer 108, and is for example 1-2 times the thickness t2 of the first elongate channels 126. For example, the thickness t4 may be anything from 1-2 mm to 1-2 cm, or more, depending on the application of the component. As will be appreciated by persons skilled in the art, the configuration may be generated in reverse; i.e., with the thickness t1 of the first metallic layer similarly greater than the thickness t4 of the second metallic layer 124. both the first metallic layer and the second metallic layer 124 may be formed with enlarged thicknesses.

Figure 7:
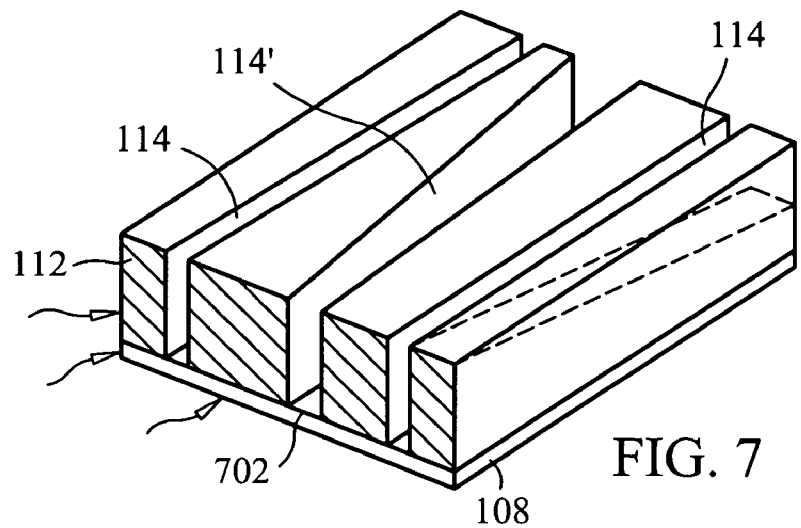
FIG. 7 illustrates the patterning of that may be performed on the or each of the mask layers in accordance with alternative embodiments of the invention.

FIG. 7 illustrates the patterning of that may be performed on the or each of the mask layers in accordance with alternative embodiments of the invention. As well as cutting the mask layer 114 to generate recesses that are of uniform cross-sectional dimensions along their length, the recesses 114' may be cut so that their width increases or decrease along their length. Having one end 702 of the recess 114' narrower than the other 704 means that the elongate channels eventually produced can have dimensions that widen or narrow long their length. Channels that widen along their length advantageously allow fluids to expand as they flow, also enhancing transfer rates.

Figure 8A:
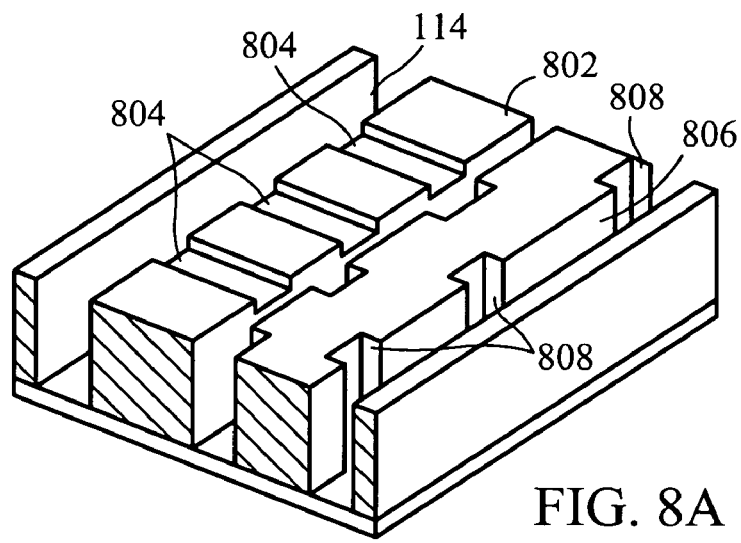
FIG. 8 illustrates (a) the patterning of that may be performed on the or each of the mask layers in accordance with alternative embodiments of the invention, and (b) the effect on the channels that are produced in the component.
Figure 8B:
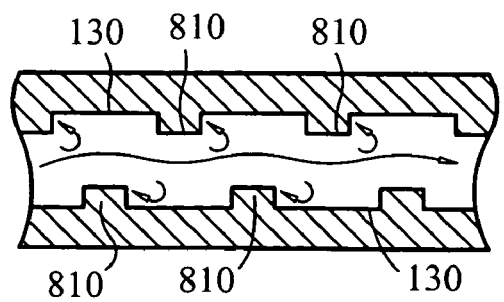

FIG. 8 (*a*) illustrates the patterning of that may be performed on the or each of the mask layers in accordance with alternative embodiments of the invention. Here, as well as producing normal recesses 114, the mask layer may be patterned (cut) on a top surface 802 to produce top recesses 804, and on side surfaces 806 to produce side recesses 808. This affects the configuration of the sidewalls (130,308) of the elongate channels that are eventually produced. The effect is illustrated in FIG. 8 (*b*): the sidewalls 130 have baffles 810 that produce complex fluid flows in use, as indicated by the arrows. Such complex non-linear flows can further assist in raising transfer efficiency.

An example of the advantageous use of the present invention is in the fabrication of optical components used in extreme ultra-violet (EUV) systems. The optical components (e.g. minors) used in such systems are typical housed, along with the source of EUV radiation (e.g. a plasma source), inside a vacuum chamber. An example of an EUV light source used in lithography applications generates EUV radiation at a wavelength of 13.4 nm, at a relatively high optical power of 100 W or more. The plasma source typically emits energy in a range of including those that will cause significant heating of neighbouring components such as the minor. There is traditionally no cooling (e.g. by air convection) of the mirror; and overheating of the minor can cause significant imperfections in the minor surface, detrimentally affecting the performance of the system.

The fabrication techniques according to appropriate embodiments of the invention may be used to reduce or eliminate this effect. Here, a mandrel (e.g. glass), having a negative of the desired final shape of the component (e.g. elliptical, parabolic; dimensions, for example, of the order of 50 mm to 200 mm for lithography applications) is first coated with a material suited to reflection of EUV energy, e.g. ruthenium, by vapour deposition. Then, the remainder of the minor is formed (e.g. in nickel) onto the ruthenium layer by the above-described techniques according to the invention, the nickel thus incorporating one or more layers of cooling channels. The mirror so formed may be one to several mm thick, for example 2 mm thick. The minor (nickel+ruthenium layers) is mechanically removed from the mandrel, and is typically ready for without substantial further working or processing.

In use, the minor may be cooled by passing a cooling fluid (e.g. water) through the system of channels integrated into the minor. Unlike other applications (e.g. rocket engines) where the operational temperatures may reach several thousand degrees, the mirror here may be operating at temperatures of several hundred degrees (e. typically 300 As this temperature is not extremely high (relative to other applications), the cross-sectional dimensions of the cooling channels in the nickel layer can be correspondingly smaller; they may be in the order of and for It will however be appreciated by persons skilled in the art that the invention is applicable to the numerous industrial applications mentioned herein, as well as others not mentioned. It will further be appreciated that that while certain techniques, process steps, materials and dimensions are described in relation to individual embodiments, such techniques, process steps, materials and dimensions may, as appropriate, be used in combination and/or varied to suit a particular application.

The invention claimed is:

1. A process for the fabrication of a metallic component, comprising:
    providing an object having a surface;
    performing a first electroforming operation, thereby forming a first metallic layer comprising metallic material on said surface;
    forming a first mask layer on said first metallic layer, said first mask layer comprising a non-conductive material;
    patterning said first mask layer, thereby providing a plurality of first recesses in said first mask layer from which said non-conductive material above said first metallic layer is removed, said first recesses having a dimension of elongation;
    performing second electroforming operation, whereby said first recesses are filled with metallic material and a second metallic layer is formed, said second metallic layer comprising, metallic material extending at least a first predetermined thickness above and or at least partially over the surface of said first mask layer;
    machining said second metallic layer to form a uniformly thick second metallic layer, said second metallic layer thereby having an upper surface;
    forming a second mask layer on the upper surface of the second metallic layer, said second mask layer comprising a non-conductive material;
    patterning the second mask layer, thereby providing a plurality of second recesses in the second mask layer from which the non-conductive material above the second metallic layer is removed, said second recesses having a dimension of elongation;
    performing a third electroforming operation using metallic material whereby said second recesses are filled with metallic material and a third metallic layer is formed comprising metallic material extending at least a second predetermined thickness above and at least partially over the surface of said mask layer;
    machining said third metallic layer to form a uniformly thick third metallic layer, said third metallic layer thereby having an upper surface; and
    removing the object and removing the non-conductive material of the first mask layer and the second mask layer, thereby producing a metallic component having first elongate channels extending therein where the non-conductive material of the first mask layer has been removed and having second elongate channels extending therein where the non-conductive material of the first mask layer has been removed.

2. The process of claim 1, wherein the object comprises:
   (A) a substrate and said surface comprises a flat or substantially flat surface of the substrate, or
   (B) a shaped mandrel, the mandrel defining said surface, the surface being at least one of cylindrical, conical, parabolic, hyperbolic, elliptical and spherical.

3. The process of claim 1, further comprising:
    removing the object and removing the non-conductive material of said first mask layer, thereby producing a metallic component having first elongate channels extending therein where the non-conductive material has been removed.

4. The process of claim 1, further comprising:
    patterning the first mask layer and/or patterning the second mask layer such that:
    (a) the first recesses are wider than the second recesses, or vice versa; and/or
    (b) the first elongate channels are wider than the second first elongate channels, or vice versa; and/or
    (c) the first elongate channels and/or the second first elongate channels taper in width or in thickness along their respective directions of elongation; and/or
    (d) the direction of elongation of the first elongate channels is at non-zero angle to that of the second first elongate channels; and/or
    (e) the first elongate channels and/or the second first elongate channels are provided with projections, sidewall recesses and/or baffling, whereby non-linear flows through such channels may be achieved.

5. The process of claim 1, further comprising:
    performing a first electroforming operation, forming a first mask layer, patterning the first mask layer, and performing second electroforming are performed such that the first metallic layer, the first mask layer and the second metallic layer extend over a predetermined first two-dimensional area; and
    forming a second mask layer, patterning the second mask layer and performing a third operation are performed such that the second metallic layer, the second mask layer and the third metallic layer extend over a predetermined second two-dimensional area; wherein the second two-dimensional area is larger than the first two-dimensional area.

6. The process of claim 1, wherein the first electroforming operation is performed such that the thickness of the first metallic layer is about 100 to 200 µm.

7. The process of claim 1, wherein said second electroforming operation is performed such that said predetermined thickness is at least as thick as the thickness of the first metallic layer, and said machining comprises machining the second metallic layer to thickness equal to or about equal to the thickness of the first metallic layer.

8. The process of claim 1, wherein said first electroforming operation is performed for an extended period, whereby the thickness of the first metallic layer is at least as large as the thickness of the first mask layer.

9. The process of claim 1, wherein said second electroforming operation is performed for an extended period, whereby the thickness of the second metallic layer is at least as large as the thickness of the first mask layer.

10. The process of claim 1, wherein forming a first mask layer comprises coating the first metallic layer with said non-conductive material to a thickness of 1-2 mm.

11. The process of claim 1, wherein removing the object and/or removing the non-conductive material comprises dissolving said non-conductive material in a solvent or melting said non-conductive material.

12. The process of claim 1, wherein the object is a metallic component.

13. The process of claim 1, wherein metallic material used in the electroforming is nickel, copper, cupronickel, nickel containing ceramic powder, or copper containing ceramic powder, or an alloy containing iron and/or cobalt.

14. The process of claim 13, wherein metallic material used in the second electroforming operation is different from metallic material used in the first electroforming operation, and/or metallic material used in the third electroforming operation is different from metallic material used in the second electroforming operation.

15. The process of claim 1, wherein the non-conductive material used in the steps of forming a first mask layer and/or forming a second mask layer comprises a low melting point polymer.

16. A process for fabricating a metallic component, comprising:

provided an object having a surface;

performing a first electroforming operation to form a first metallic layer comprising metallic material on the surface;

forming a first mask layer of a non-conductive material on the first metallic layer;

patterning the first mask layer to provide a plurality of first recesses therein from which said non-conductive material above said first metallic layer is removed, the first recesses having an elongate dimension;

performing a second electroforming operation that fills the first recesses with a metallic material and that forms a second metallic layer wherein the metallic material extends at least a first predetermined thickness above or at least partially over the first mask layer surface;

machining the second metallic layer to form a uniformly thick second metallic layer having an upper surface;

forming a second mask layer on the upper surface of the second metallic layer, the second mask layer comprising a non-conductive material formed by coating the second metallic layer with the non-conductive material to a thickness of 1-2 mm, or to a thickness greater than the thickness of the first mask layer;

patterning the second mask layer to provide a plurality of second recesses in the second mask layer from which the non-conductive material above the second metallic layer is removed, the second recesses having an elongate dimension; and performing a third electroforming operation using metallic material whereby the second recesses are filled with metallic material, the metallic material forming a third metallic layer that extends at least a second predetermined thickness above or at least partially over the surface of said mask layer.

* * * * *